(12) United States Patent
Cho et al.

(10) Patent No.: US 10,129,376 B2
(45) Date of Patent: Nov. 13, 2018

(54) MOBILE TERMINAL

(71) Applicant: LG ELECTRONICS INC., Seoul (KR)

(72) Inventors: Soheon Cho, Seoul (KR); Hokyoung Koong, Seoul (KR); Minbok Lee, Seoul (KR); Woosun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/559,404

(22) PCT Filed: May 7, 2015

(86) PCT No.: PCT/KR2015/004524
§ 371 (c)(1),
(2) Date: Sep. 18, 2017

(87) PCT Pub. No.: WO2016/153101
PCT Pub. Date: Sep. 29, 2016

(65) Prior Publication Data
US 2018/0084092 A1    Mar. 22, 2018

(30) Foreign Application Priority Data

Mar. 20, 2015  (KR) ........................ 10-2015-0039075

(51) Int. Cl.
*H04M 1/00* (2006.01)
*H04M 1/02* (2006.01)
(Continued)

(52) U.S. Cl.
CPC ........ *H04M 1/0262* (2013.01); *H04B 1/3883* (2013.01); *H04M 1/02* (2013.01); *H04M 1/0266* (2013.01); *H04W 88/06* (2013.01)

(58) Field of Classification Search
CPC .. H04M 1/0262; H04M 1/0266; H04B 1/3883
(Continued)

(56) References Cited

U.S. PATENT DOCUMENTS

| 5,824,431 A | 10/1998 | Tsurumaru et al. |
| 8,660,619 B2 * | 2/2014 | Kil ........................... H02J 9/06 455/574 |

(Continued)

FOREIGN PATENT DOCUMENTS

| DE | 4102887 | 6/1993 |
| EP | 2413573 | 2/2012 |

(Continued)

OTHER PUBLICATIONS

PCT International Application No. PCT/KR2015/004524, International Search Report dated Jan. 29, 2016, 4 pages.

(Continued)

*Primary Examiner* — Md Talukder
(74) *Attorney, Agent, or Firm* — Lee, Hong, Degerman, Kang & Waimey

(57) ABSTRACT

The present invention relates to a mobile terminal. Provided is a mobile terminal comprising: a display unit having a window; a main body on which the display unit is seated, wherein an internal space is formed between the main body and the display unit; a sliding unit having a first battery accommodated therein, wherein the sliding unit implements a first state where the sliding unit is inserted into the internal space and a second state where the sliding unit is extracted from the internal space; and a second battery provided in the internal space to supply electric power when the first battery is extracted, wherein in the first state, wireless communication for mobile communication and an operation by software are performed using the first battery, and in the second state, the wireless communication for mobile communication is (Continued)

interrupted, and the operation by the software is performed using the second battery.

24 Claims, 15 Drawing Sheets

(51) Int. Cl.
*H04W 88/06* (2009.01)
*H04B 1/3883* (2015.01)

(58) Field of Classification Search
USPC .......................................... 455/575.1, 575.3
See application file for complete search history.

(56) References Cited

U.S. PATENT DOCUMENTS

| | | | | |
|---|---|---|---|---|
| 2009/0312054 A1* | 12/2009 | Choi | ..................... | H04B 1/3816 |
| | | | | 455/558 |
| 2010/0222110 A1* | 9/2010 | Kim | ..................... | G06F 1/1616 |
| | | | | 455/566 |
| 2010/0291979 A1* | 11/2010 | Jeong | ..................... | G06F 1/1675 |
| | | | | 455/575.4 |
| 2011/0009172 A1* | 1/2011 | Song | ................. | H04M 1/72544 |
| | | | | 455/573 |
| 2012/0004000 A1* | 1/2012 | Choi | ..................... | H02J 7/0044 |
| | | | | 455/507 |
| 2012/0026656 A1* | 2/2012 | Lee | ..................... | H01M 2/1066 |
| | | | | 361/679.01 |
| 2012/0028692 A1* | 2/2012 | Nishizono | .............. | H01Q 1/243 |
| | | | | 455/575.1 |
| 2012/0206212 A1* | 8/2012 | Xiao | ..................... | H01Q 1/243 |
| | | | | 333/25 |
| 2012/0322431 A1 | 12/2012 | Kil et al. | | |
| 2014/0191033 A1* | 7/2014 | Wojcik | ................... | G06K 7/082 |
| | | | | 235/449 |

FOREIGN PATENT DOCUMENTS

| | | |
|---|---|---|
| JP | 05-115128 | 5/1993 |
| KR | 20060039745 | 5/2006 |
| KR | 20060095662 | 9/2006 |
| KR | 20120010922 | 2/2012 |
| KR | 20120138311 | 12/2012 |
| KR | 20130006096 | 10/2013 |

OTHER PUBLICATIONS

Korean Intellectual Property Office Application No. 10-2015-0039075, Notice of Allowance dated Nov. 29, 2015, 2 pages.
Korean Intellectual Property Office Application No. 10-2015-0039075, Office Action dated Mar. 14, 2016, 6 pages.
European Patent Office Application Serial No. 15886549.3, Search Report dated Jul. 30, 2018, 9 pages.

* cited by examiner

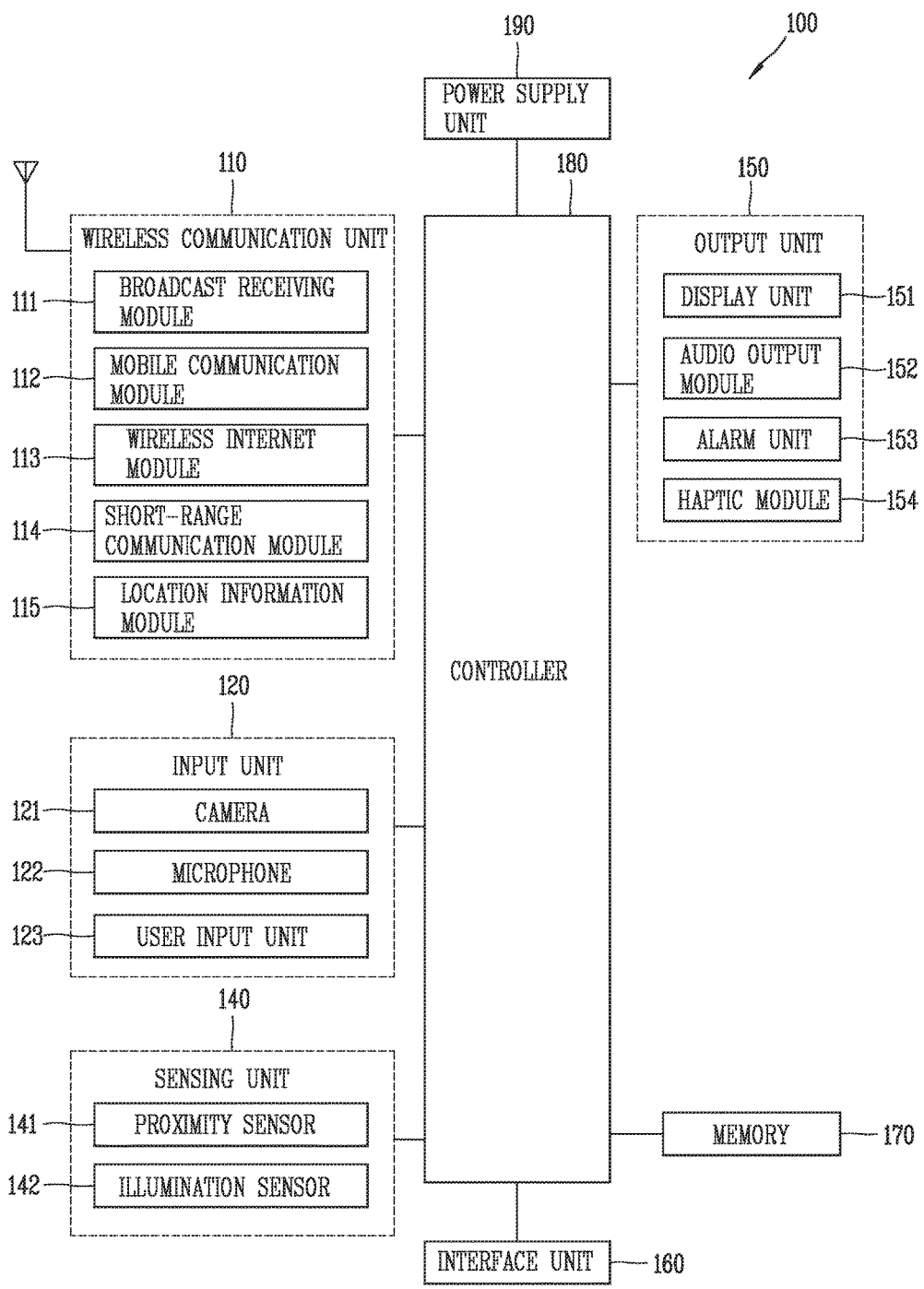

MOBILE TERMINAL

CROSS-REFERENCE TO RELATED APPLICATIONS

This application is the National Stage filing under 35 U.S.C. 371 of International Application No. PCT/KR2015/004524, filed on May 7, 2015, which claims the benefit of earlier filing date and right of priority to Korean Application No. 10-2015-0039075, filed on Mar. 20, 2015, the contents of which are all hereby incorporated by reference herein in their entirety.

TECHNICAL FIELD

The present invention relates to a mobile terminal that enables insertion and removal of a battery.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players.

Efforts are ongoing to support and increase the functionality of mobile terminals. Such efforts include software and hardware improvements, as well as changes and improvements in the structural components.

Conventionally, in order to replace a battery on a mobile terminal, the battery cover should be removed, but an embedded battery is not replaceable, thus leading to a problem with the battery's capacity.

DISCLOSURE OF THE INVENTION

Therefore, an object of the present invention is to solve the aforementioned problem and other problems. Another object of the present invention is to provide a mobile terminal that allows for easy replacement of a battery.

To achieve these and other advantages and in accordance with the purpose of the present invention, as embodied and broadly described herein, there is provided a mobile terminal including: a display portion with a window; a main body portion where the display portion rests, with an inner space formed between the main body portion and the display portion; a sliding portion that is brought into a first position for insertion into the inner space and a second position for removal from the inner space, and that accommodates a first battery; a second battery that is provided in the inner space and supplies electric power to the mobile terminal when the first battery is removed, wherein, in the first position, wireless communications for mobile communication and software operations are enabled by the first battery, and, in the second position, wireless communications for mobile communication are interrupted and software operations are enabled by the second battery.

According to an aspect of the present invention, the main body portion may comprise: a case with a rear and a side protruding from the rear towards the front; and a bracket affixed to the inner side of the case, wherein a guide rail is formed along the length, on the inner side of the case, and the sliding portion moves along the guide rail.

According to an aspect of the present invention, the mobile terminal may further comprise a slide button that is exposed to the exterior of the main body portion to selectively lock the sliding portion, wherein the sliding portion comprises: a first accommodating portion that is curved to accommodate the first battery, has horizontally extending flaps at both ends, and moves on the guide rail when fastened to the main body portion; and a second accommodating portion that is placed under the first accommodating portion and has a main antenna for performing a wireless communication function.

According to an aspect of the present invention, the mobile terminal may further comprise a locking device that is provided on the bracket, is placed between the slide button and the sliding portion, and selectively locks the sliding portion.

According to an aspect of the present invention, the locking device may comprise: a locking member whose one end is caught on a pushing protrusion protruding inwards from the slide button, and whose the other end is fastened to the sliding portion, both of which rotate about a rotary shaft; and a first elastic member that is attached to the locking member and provides torque to the locking member.

According to an aspect of the present invention, the other end of the locking member may take the shape of a hook, and the hook may be selectively caught on a protuberance formed at the top of the sliding portion.

According to an aspect of the present invention, the first elastic member may be a torsion spring.

According to an aspect of the present invention, the locking device may comprise: a plate member with elasticity that makes contact with a pushing protrusion protruding inwards from the slide button; a moving member that is provided on the inside of the plate member, with one end being pressed by the pushing protrusion and the other end having a shaft; a second elastic member that surrounds the shaft of the moving member and provides restoring force to the moving member; a base member that surrounds the moving member and the second elastic member and has a first through hole at one end through which the shaft passes and a second through hole at the other end through which an end of the moving member makes contact with the plate member; and a link member that rotates about a stationary shaft provided at the center of the second elastic member, with one end being attached to the other end of the moving member and the other end being fastened to the sliding portion.

According to an aspect of the present invention, a bump may be formed on the plate member to detect movement of the pushing protrusion.

According to an aspect of the present invention, a hook may be formed at the other end of the link member, and the sliding portion may have a protuberance that is caught on the hook.

According to an aspect of the present invention, the moving member may comprise: an exposure portion that is exposed externally through the second through hole; and an expanded portion that extends from the exposure portion, has a larger area than the exposure portion, and is caught in the second through hole.

According to an aspect of the present invention, a long hole may be formed at one end of the link member and fastened to the moving member by a fixing pin.

According to an aspect of the present invention, a third elastic member may be provided under the bracket and provides restoring force to the sliding portion.

According to an aspect of the present invention, the display portion may comprise: a display module provided on the back of the window; and a main circuit board provided on the back of the display module, wherein a first contact terminal of the first battery and a first connector making contact with the first contact terminal are provided on one side of the main circuit board.

According to an aspect of the present invention, a flexible circuit board may be provided in the first accommodating portion, a second contact terminal may be provided at an end of the flexible circuit board, and a second connector electrically connected to the second contact terminal may be provided on one side of the main circuit board.

According to an aspect of the present invention, the guide rail may comprise: a guide protruding from the inner side of the case; and a rail that is provided within the guide and has a groove along the length in which the flaps of the sliding portion are inserted, wherein the rail is made of a plastic material.

According to an aspect of the present invention, ribs protruding towards the inside of the groove may be formed on the rail so as to hold the sliding portion when fastened to the main body portion.

According to an aspect of the present invention, a stopper may be provided at the sliding portion, and a stopper rib is formed on the guide rail to catch the stopper to thereby restrict the movement of the sliding portion.

According to an aspect of the present invention, a first magnet member may be provided in the second accommodating portion, and a second magnet member may be provided at a position in the main body portion that corresponds to the first magnet member.

According to an aspect of the present invention, the main body portion may have a Hall sensor to detect a change in magnetism on the first magnet member.

According to an aspect of the present invention, the case may be made of a metallic material.

According to an aspect of the present invention, an antenna made of a metallic material may form the exterior on one side of the second accommodating portion.

According to an aspect of the present invention, the second accommodating portion may comprise a lighting portion made of a transparent or opaque material at the region of contact with the main body portion, and a light source may be provided in the second accommodating portion to send light to the outside through the lighting portion.

According to an aspect of the present invention, a module may be provided in the second accommodating portion to allow for mounting of a different module each time the sliding portion is replaced.

According to an aspect of the present invention, the antenna may have a different frequency range depending on the sliding portion.

The advantages of a mobile terminal and a method of controlling the same according to the present invention will be described below.

At least one of the embodiments of the present invention, a battery can be replaced easily because a sliding portion accommodating the battery is taken out by pressing a slide button on a side of the mobile terminal.

At least one of the embodiments of the present invention, a battery can be replaced even if a case has a uni-body metal design, and no battery cover is required, thereby simplifying the structure of the mobile terminal and reducing the thickness of the mobile terminal.

At least one of the embodiments of the present invention, the sliding portion is equipped with a module whose function varies depending on the sliding portion, and therefore the module may have a different function each time the sliding portion is replaced.

At least one of the embodiments of the present invention, an antenna provided on the outer surface of the sliding portion has a different frequency range depending on the sliding portion, and therefore the same mobile terminal may be used in different regions immediately, simply by replacing the sliding portion. That is, each country or region uses a different radio frequency range, and a plurality of sliding portions 130 may be made in such a manner that their antenna uses a different frequency range for a certain country or region. Thus, simply by replacing the sliding portion 130 with another sliding portion with an antenna with a frequency range required for the region where the user is located, wireless communications for mobile communication in that region are made available on the same mobile terminal.

Further scope of applicability of the present invention will become apparent from the detailed description given hereinafter, However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1A is a block diagram illustrating a mobile terminal according to an embodiment of the present invention;

MODES FOR CARRYING OUT THE PREFERRED EMBODIMENTS

Figure 1B:
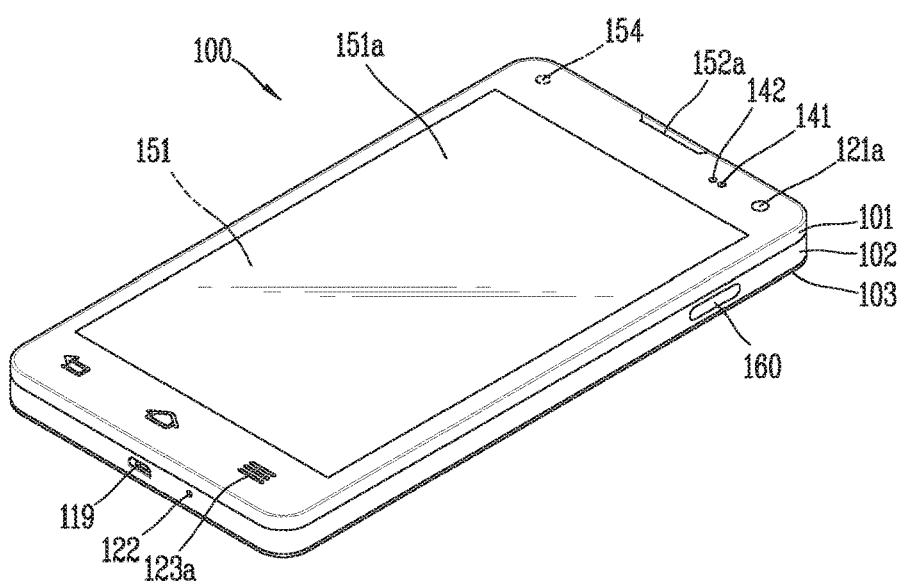
FIGS. 1B and 1C are conceptual diagrams of an example of a typical mobile terminal when viewed from different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, a digital signage and the like.

Figure 1C:
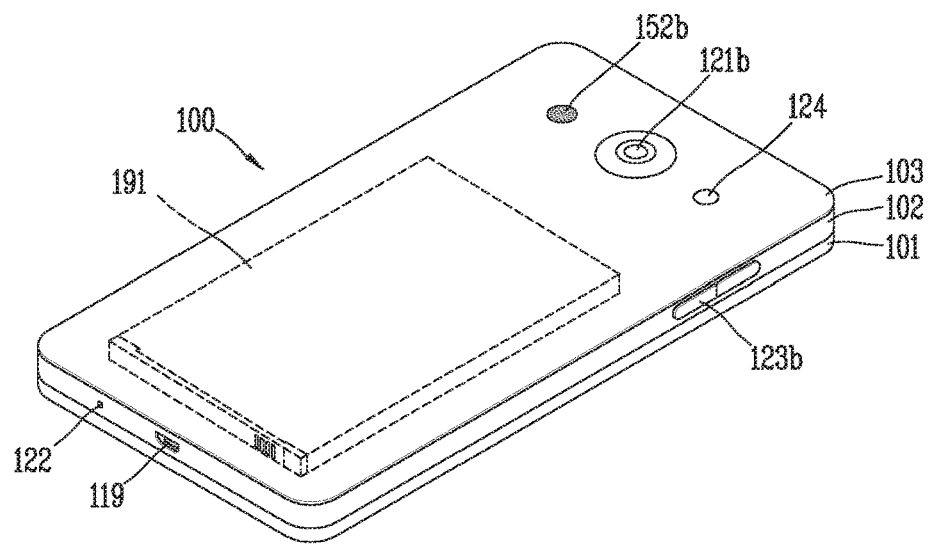

FIG. 1A is a block diagram of a mobile terminal in accordance with the present disclosure. FIGS. 1B and 1C are conceptual diagrams of an example of a typical mobile terminal when viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components shown in FIG. 1A is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from at least two sensors of the sensing unit, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170.

Further, the controller 180 controls some or all of the components shown in FIG. 1A in order to drive application programs stored in the memory 170. Further, in order to drive the application programs, the controller 180 may operate at least two of the components included in the mobile terminal 100 in a combined manner.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of the mobile terminal according to various embodiments to be explained later. The operation or the control method of the mobile terminal may be implemented on the mobile terminal by driving at least one application program stored in the memory 170.

Hereinafter, the above components will be explained in more detail with reference to FIG. 1A before various embodiments implemented through the aforementioned mobile terminal 100 are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal 100 may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to indicate the mobile terminal 100 regarded as at least one integrated body.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first and second audio output modules 152a,152b, the proximity sensor 141, the illumination sensor 142, the optical output unit 154, the first and second cameras 121a, 121b, the first and second manipulation units 123a, 123b, the microphone 122, the interface unit 160, etc.

As shown in FIGS. 1B and 1C, the mobile terminal 100 will be explained under an assumption that the display unit 151, the first audio output module 152a, the proximity sensor 141, the illumination sensor 142, the optical output unit 154, the first camera 121a, and the first manipulation unit 123a are located on a front surface of the terminal body, the second manipulation unit 123b, the microphone 122 and the interface unit 160 are located on a side surface of the terminal body, and the second audio output module 152b and the second camera 121b are located on a rear surface of the terminal body.

However, it is to be understood that alternative arrangements are possible and within the teachings of the instant disclosure. Some components may be omitted or rearranged. For example, the first manipulation unit 123a may not be located on the front surface of the terminal body, and the second audio output module 152b may be located on the side surface of the terminal body rather than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like. The drawing illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 (refer to FIG. 1A) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Reference will now be made in detail to exemplary embodiments related to a mobile terminal with the above configuration, examples of which are illustrated in the accompanying drawings. It will be apparent to those skilled in the art that the present invention can be embodied in other specific forms without departing from the spirit and essential characteristics of the invention.

Figure 2:
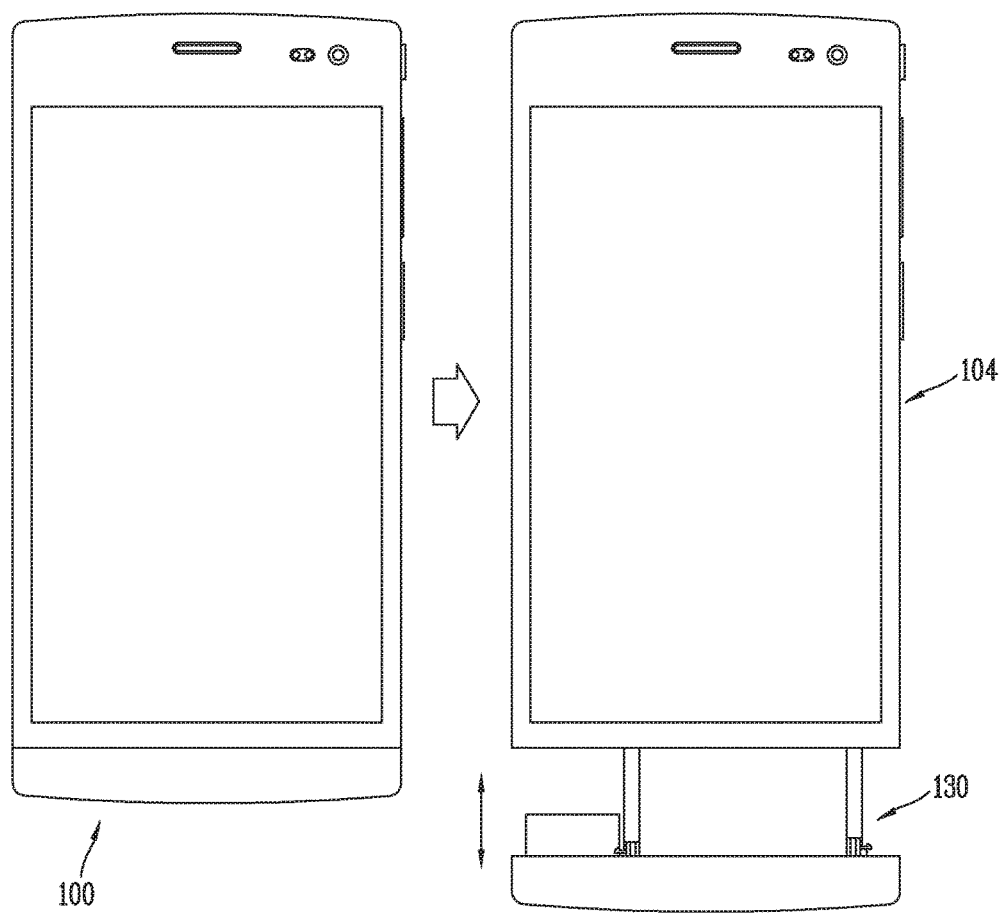
FIG. 2 is a conceptual diagram illustrating an example of using a mobile terminal according to an embodiment of the present invention.
Figure 3:
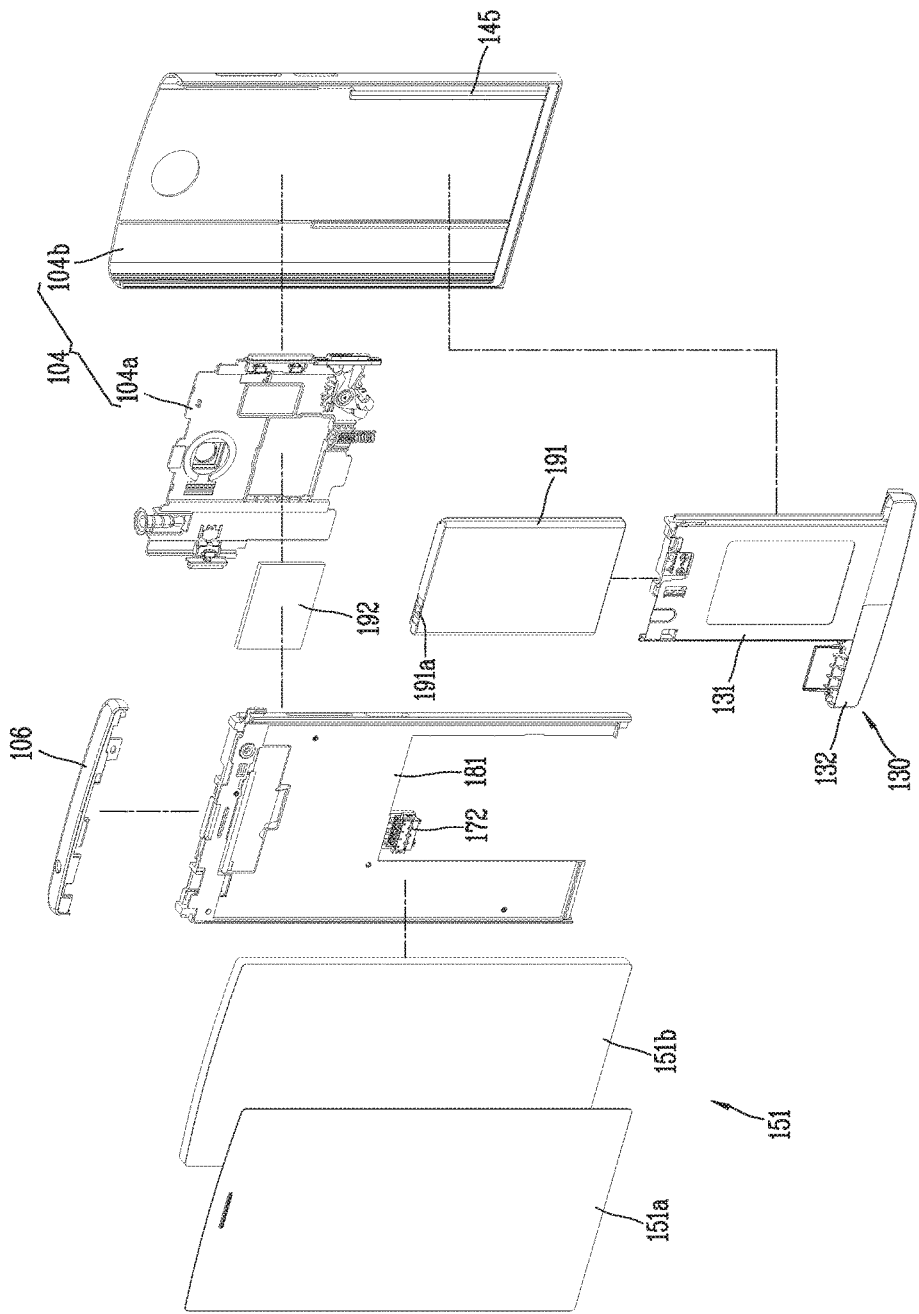
FIG. 3 is an exploded perspective view of a mobile terminal according to an embodiment of the present invention.

FIG. 2 is a conceptual diagram illustrating an example of using a mobile terminal according to an embodiment of the present invention. FIG. 3 is an exploded perspective view of a mobile terminal according to an embodiment of the present invention. Hereinafter, an embodiment of the present invention will be described with reference to FIGS. 2 and 3.

In an embodiment of the present invention, in order to replace a main battery that supplies electric power to a mobile terminal, a battery tray may be inserted into or removed from the main body of the mobile terminal. That is, as shown in FIG. 2, a mobile terminal according to an embodiment of the present invention allows a sliding portion 130 for accommodating a battery to be inserted into or taken out from the bottom of the mobile terminal. The sliding portion 130 has a structure that prevents the sliding portion 130 from being fully taken out of the mobile terminal.

A mobile terminal according to an embodiment of the present invention includes a display portion 151 with a window 151a, a main body portion 104 where the display portion 151 rests, with an inner space formed between the main body portion 104 and the display portion 151, and a sliding portion 130 that is brought into a first position for insertion into the inner space and a second position for removal from the inner space, and that accommodates a first battery 191. The sliding portion 130 may be inserted into or taken out from the bottom of the main body portion 104. A variety of electronic parts are provided in the inner space, and a metallic intermediary frame 151c (see FIG. 15) may be provided for rigidity. However, when the main body portion 104 is formed from a metallic material, the main body portion 104 may add rigidity and therefore the intermediary frame 151 may be unnecessary.

Moreover, in an embodiment of the present invention, the display portion 151, which is placed towards the front, and the main body portion 104, which covers the rear of the display portion 151 and forms the inner space, form the exterior of the mobile terminal, and the sliding portion 130 forms the exterior of the bottom of the mobile terminal.

The second position refers to a position in which the first battery 191 is separated from the main body portion 104. The mobile terminal is powered off when the first battery 191 is separated. To prevent this, in an embodiment of the present invention, the mobile terminal includes a second battery 192 that is provided in the inner space and supplies electric power to the mobile terminal when the first battery 191 is removed. In this case, the first battery 191 is a main battery that activates the mobile terminal, and the second battery 192 is an auxiliary battery reserved for when the first battery 191 is not present.

Figure 13:
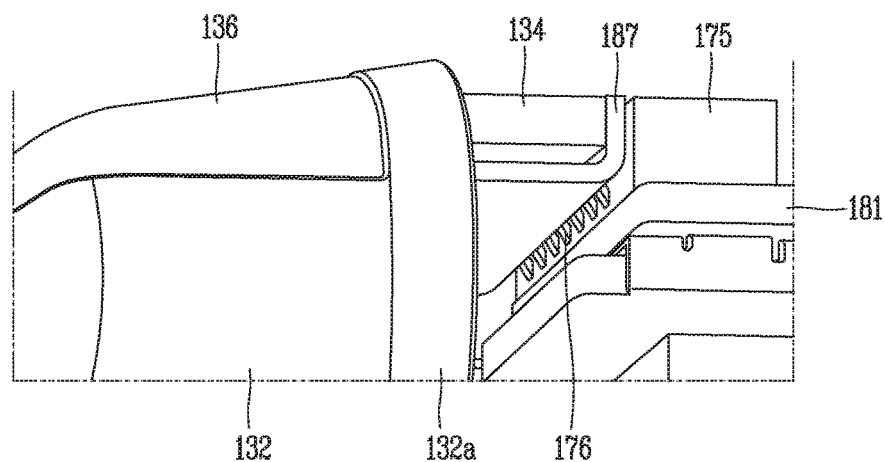
FIG. 13 is a perspective view of a mobile terminal according to an embodiment of the present invention when viewed from the side of the bottom.

That is, as shown in FIG. 3, the display portion 151 according to an embodiment of the present invention includes a window 151a and a display module 151b placed under the window 151a. The window 151a and the display module 151b are approximately rectangular in shape like the mobile terminal. A main circuit board 181 is provided on the back of the display module 151b, and a plurality of electronic parts are mounted on the main circuit board 181. Hereinafter, the window 151a, display module 151b, and main circuit board 181 will be collectively referred to as the display portion 151. In this case, the main circuit board 181 does not necessarily have the same shape as the window 151a or the display module 151b, and may have an approximately '⊏'-shape or 'C'-shape, as shown in FIG. 13.

A top antenna 106 is provided at the top of the display 151. The top antenna 106 functions mostly as an LTE/WCDMA Rx Only antenna, a GPS antenna, or a BT/WiFi antenna. Moreover, a main antenna 136 (see FIG. 13) is provided at the bottom of the display portion 151, more specifically, at the sliding portion 130 to be described later.

According to an embodiment of the present invention, in the first position, wireless communications for mobile communication and software operations are enabled by the first battery 191, and, in the second position, wireless communications for other types of communication than mobile communication and software operations are enabled by the second battery 192. That is, applications embedded in the mobile terminal work normally in the first and second positions, whereas wireless communications for mobile communication are interrupted in the second position.

Wireless signals used in wireless communications for mobile communication may include sent and received audio signals, sent and received video call signals, or various forms of data in sent and received text/multimedia messages.

To this end, a mobile communication module 112 is provided. The mobile communication module 112 sends and receives wireless signals to and from at least one among a base station, an external terminal, and a server, over a mobile communication network which is constructed according to technical standards or communication schemes for mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A) etc.).

Generally, when the battery is removed from the main body of the mobile terminal in order to replace the battery, the mobile terminal is powered off, and when the battery is reloaded, the applications boot up as the power is turned on. This means that the applications need to boot up each time the battery is replaced, which takes much time until the mobile terminal gets back to normal operation and requires the applications installed on the mobile terminal to be re-executed.

However, as in an embodiment of the present invention, the second battery 192 may supply electric power to the mobile terminal while the first battery 191, i.e., the main battery, is being replaced. In this case, electric power continues to be supplied without being disconnected, and only a minimum amount of electric power needed for operation is supplied and wireless communications for mobile communication are interrupted. In an embodiment of the present invention, since the main antenna 136 for mobile communication is provided at the sliding portion 130, short-range wireless communication functions such as Bluetooth are still available although wireless communications for mobile communication are interrupted.

In conclusion, in an embodiment of the present invention, the first position refers to a position in which the first battery 191 is mounted on the mobile terminal and works normally, and the second position refers to a position in which the first battery 191 is separated from the mobile terminal. That is, the first position refers to a position in which all functions work normally, and the second position refers to a position in which wireless communications, i.e., wireless calls, using the main antenna 136 placed at the bottom of the mobile terminal are interrupted, Bluetooth/WiFi functions work normally, and the applications installed on the mobile terminal work normally.

Moreover, in an embodiment of the present invention, the main body portion 104 includes a case 104b with a rear and a side protruding from the rear towards the front, and a bracket 104a affixed to the inner side of the case 104b.

That is, in an embodiment of the present invention, the case 104b accommodates the display portion 151, the sliding portion 130 is inserted into an inner space between the case 104b and the display portion 151, and a variety of electronic parts are provided in the inner space. Thus, the case 104b protrudes by a certain height towards the front from the rear. The protruding portion forms a side of the mobile terminal. The top antenna 106 and the sliding portion 130 are attached to the top and bottom of the case 104b, respectively, and the top antenna 106 and the sliding portion 130 form the top and bottom sides of the mobile terminal. Thus, the case 104b has an approximately '⊏'-shape or 'C'-shape, with a portion protruding towards the front from both opposite ends of the main surface.

Figure 1D:
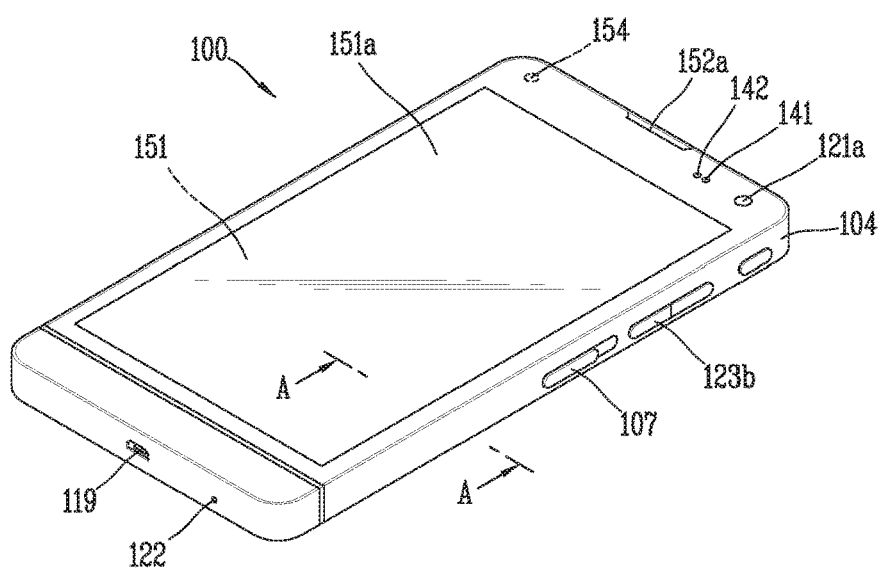
FIGS. 1D and 1E are conceptual diagrams of an example of a mobile terminal according to the present invention when viewed from different directions.
Figure 1E:
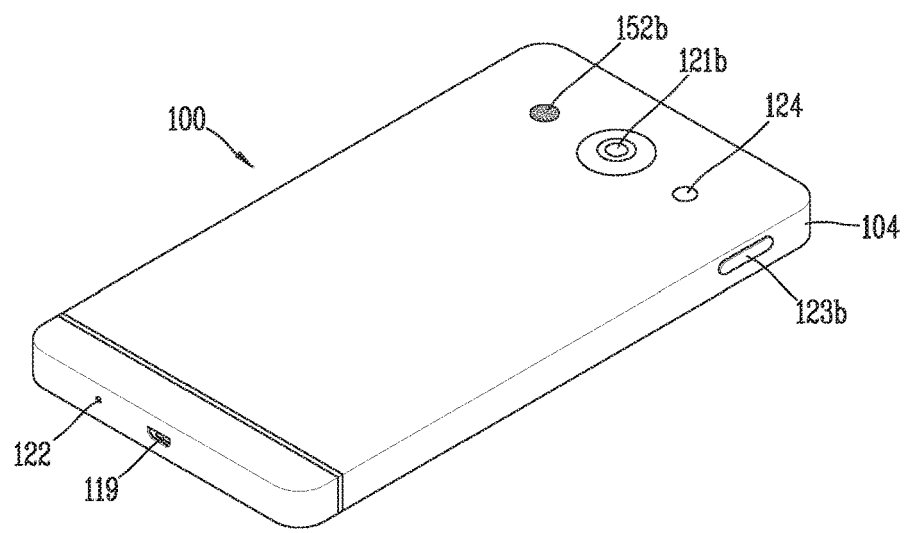

As shown in FIGS. 1D and 1E, in an embodiment of the present invention, the case 104b is illustrated as being a uni-body. However, an embodiment of the present invention is not limited to this, but a front case 101, a rear case 102, and a rear cover 103 may form the exterior of the mobile terminal, as shown in FIGS. 1B and 1C.

Moreover, the bracket 104a is provided on the inner side of the case 104b, and a variety of electronic parts may be provided on the bracket 104a. In an embodiment of the present invention, a space for accommodating the second battery 192 or a space for accommodating a locking device 155 or 165 may be formed.

In addition, as shown in FIG. 3, a guide rail 145 is formed along the length of the mobile terminal, on the inner side of the case 104b, and the sliding portion 130 moves along the guide rail 145.

Figure 4:
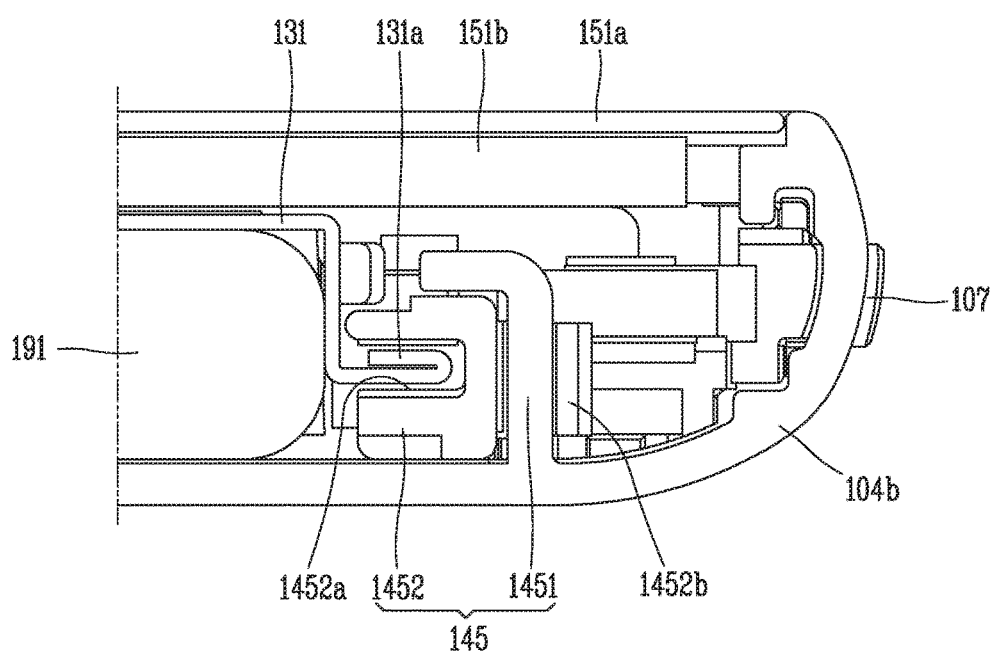
FIG. 4 is a cross-sectional view taken along AA of FIG. 1D.

FIG. 4 is a cross-sectional view taken along AA of FIG. 1D. Referring to FIGS. 3 and 4, the sliding portion 130 includes a first accommodating portion 131 that is curved to accommodate the first battery 191, has horizontally extending flaps 131a at both ends, and moves on the guide rail 145 when fastened to the main body portion 104, and a second accommodating portion 132 that is placed under the first accommodating portion 131 and has a main antenna for performing a wireless call function. It can be seen that a cross-section of the first accommodating portion 131 has an approximately 'ᄃ'-shape or 'C'-shape. In this manner, the first accommodating portion 131 is curved in one direction to thereby accommodate the first battery 191, and the flaps 131a extending along the width of the mobile terminal at both ends of the first accommodating portion 131 are movable on the guide rail 145.

The guide rail 145 includes a guide 1451 protruding from the inner side of the case 104b and a rail 1452 that is provided within the guide 1451 and has a groove along the length in which the flaps 131a of the sliding portion 130 are inserted. The guide 1451 may protrude inwards from the main surface of the case 104b, and be made of a metallic material like the case 104b, and the rail 1452 may be made of a plastic material. The reason why the rail 1452 is made of a plastic material is to reduce frictional sound between the flaps 131 and the rail 1452 when the first accommodating portion 131 is made of a metallic material. Accordingly, if the first accommodating portion 131 is made of a plastic material, the rail 1452 may be made of a metallic material.

The guide 1451 protrudes in an l'-shape from the inner side of the case 104b to keep the rail 1452 from coming off easily. The rail 1452 has a fine groove 1452a along the length of the mobile terminal so that the flaps 131a of the first accommodating portion 131 can move while inserted in the groove 1452a. The rail 1452 may be separated from the guide 1451, and an outwardly curved portion 1452b is formed at the top and bottom edges of the rail 1452 so that the rail 1452 is fastened to the guide 1451. To this end, the rail 1452 needs to be made longer than the guide 1451.

Although an embodiment of the present invention is illustrated with respect to the guide rail 145 provided on the inner side of the case 104b, the present invention is not necessarily limited to this, and the intermediary frame 151c may be provided on the back of the display portion 151 and the guide rail 145 may be provided on the intermediary frame 151c.

A mobile terminal according to an embodiment of the present invention further includes a slide button 107 or 107' that is exposed to the exterior of the main body portion 104 to selectively lock the sliding portion 130. The slide button 107 or 107' is vertically movable.

Moreover, according to an embodiment of the present invention, the mobile terminal further includes a locking device 155 or 165 that is placed between the slide button 107 or 107' and the sliding portion 130 and selectively locks the sliding portion 130.

Figure 5:
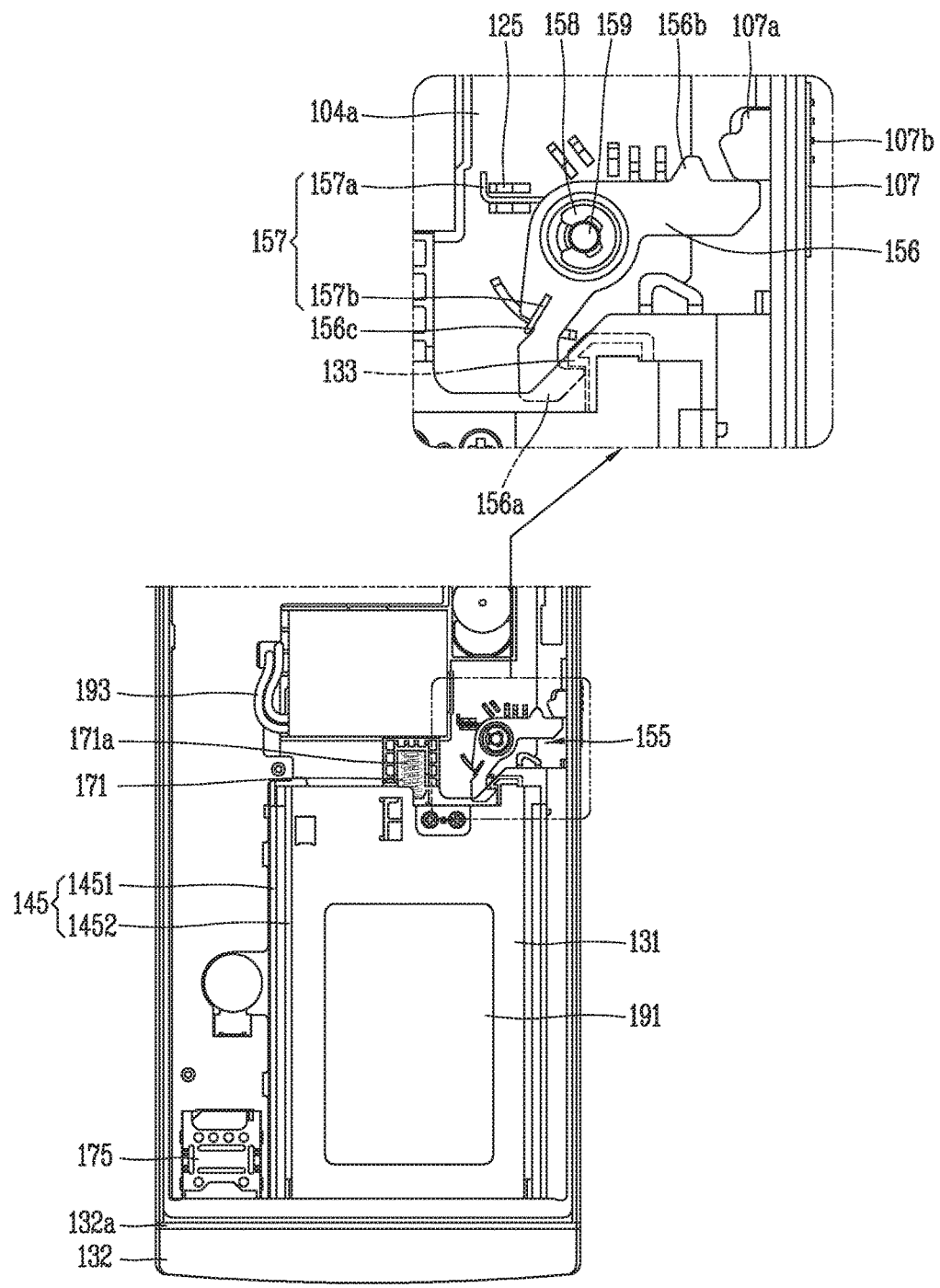
FIG. 5 is a view illustrating a sliding portion that is locked by a locking device according to an embodiment of the present invention.
Figure 6:
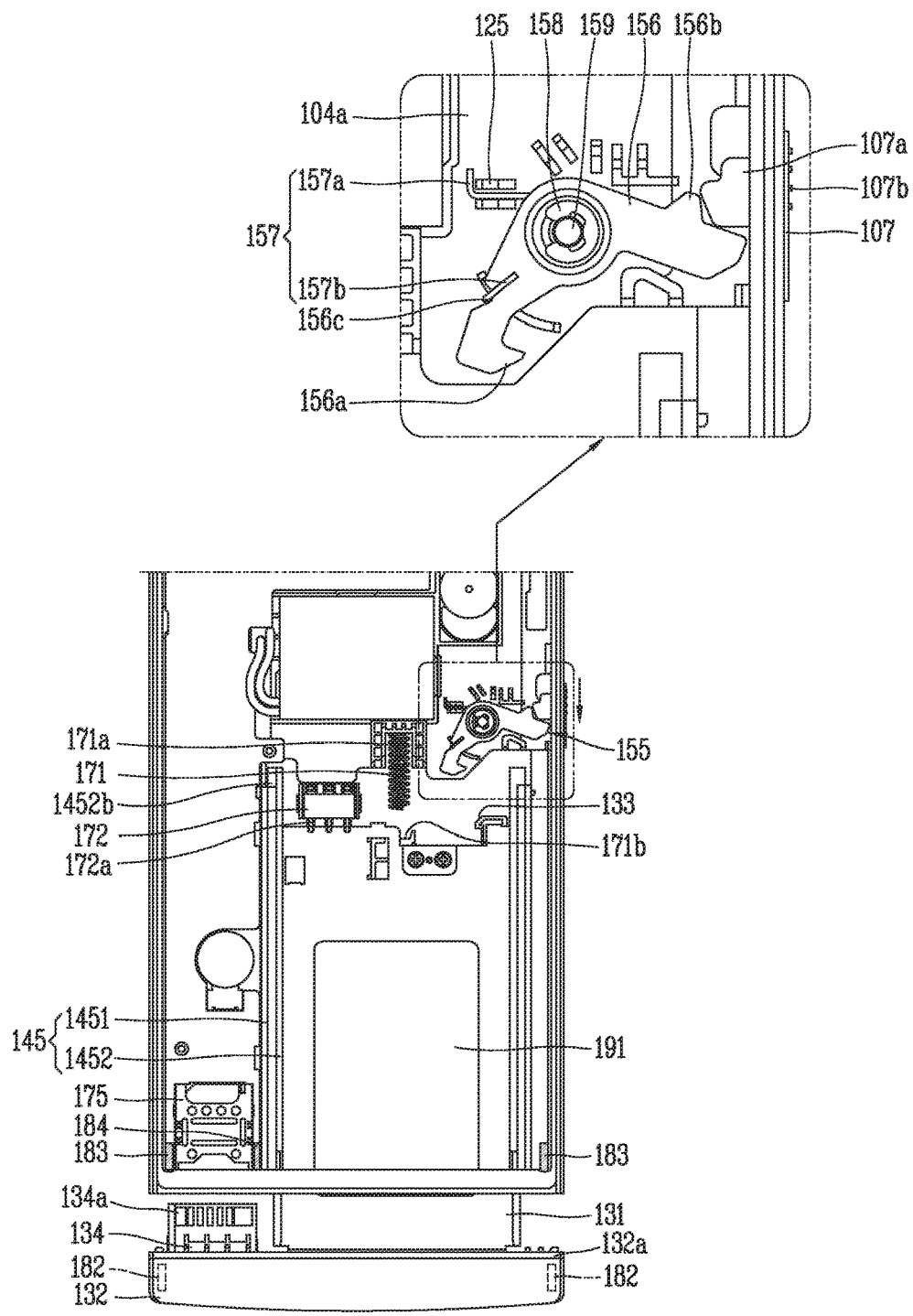
FIG. 6 is a view illustrating a sliding portion that is unlocked by a locking device according to an embodiment of the present invention.
Figure 7:
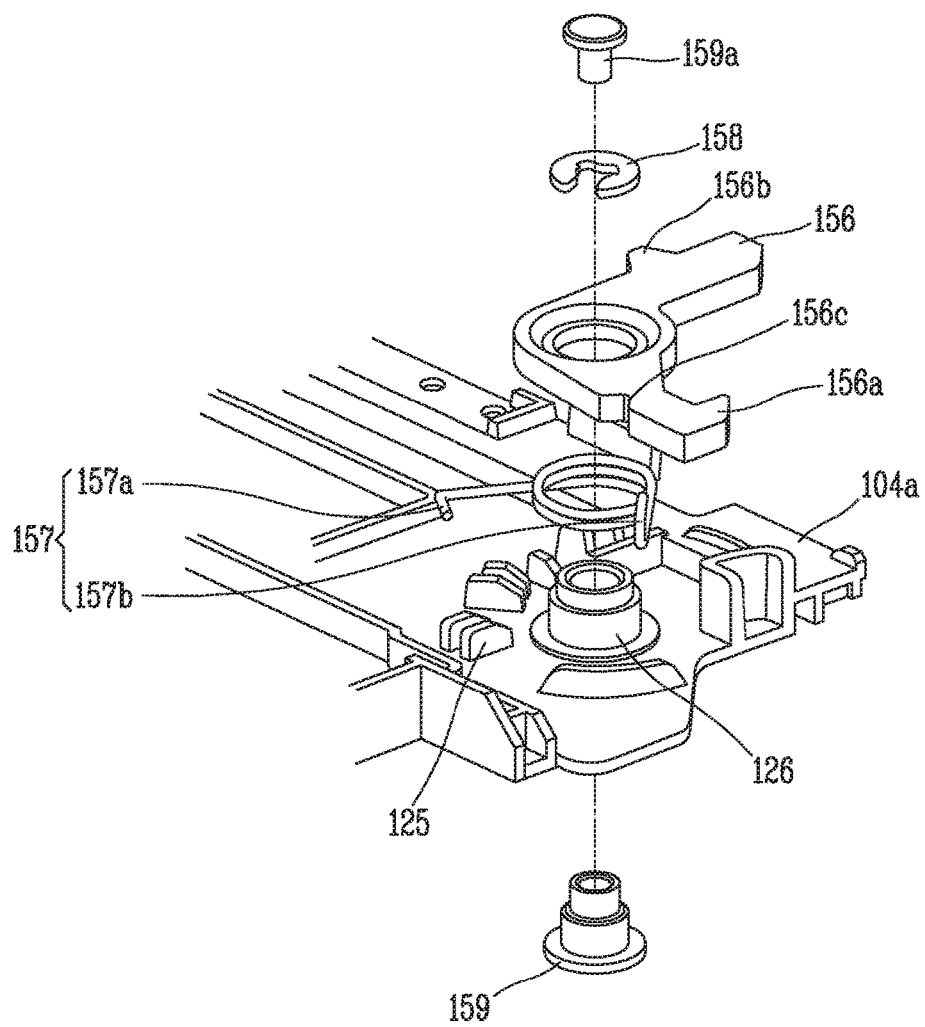
FIG. 7 is an exploded perspective view of a locking device according to an embodiment of the present invention.
Figure 8A:
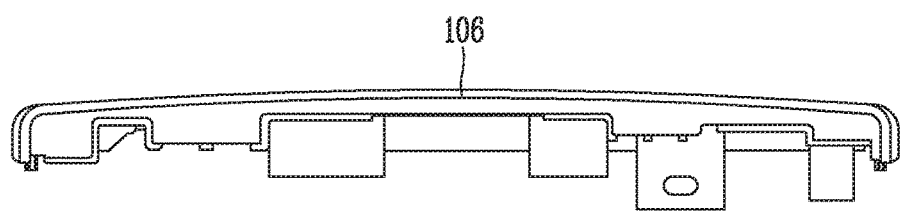
FIG. 8A is a schematic view of a top antenna according to an embodiment of the present invention.
Figure 8B:
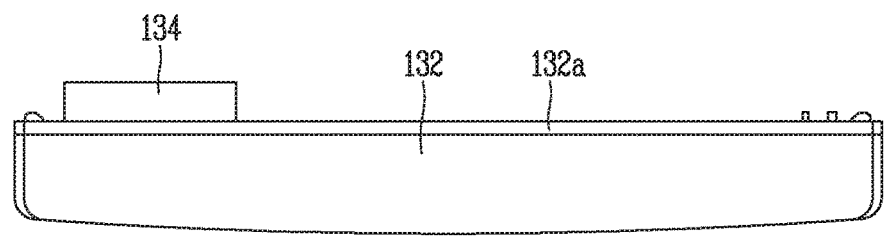
FIG. 8B is a schematic view of a bottom antenna according to an embodiment of the present invention.
Figure 9A:
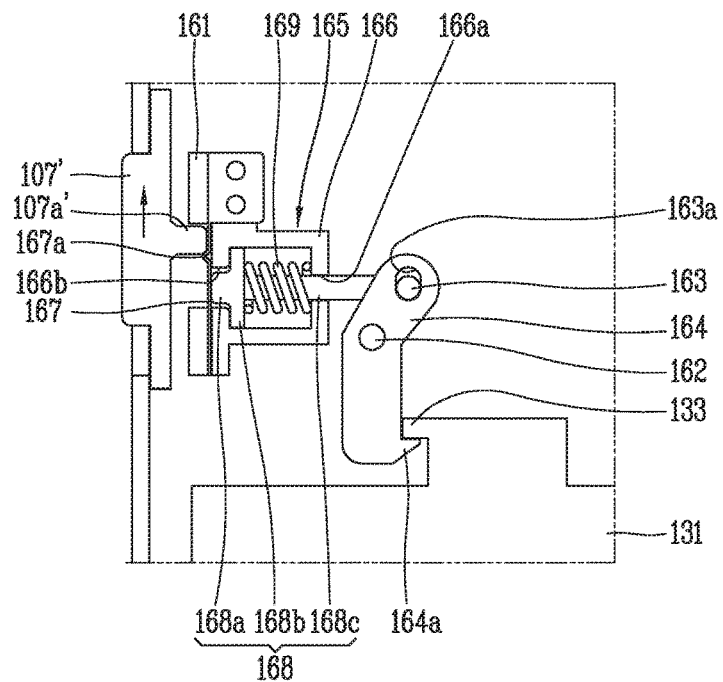
FIGS. 9A to 9C are views illustrating an operative mechanism in which the sliding portion is unlocked by the locking device according to an embodiment of the present invention.
Figure 9B:
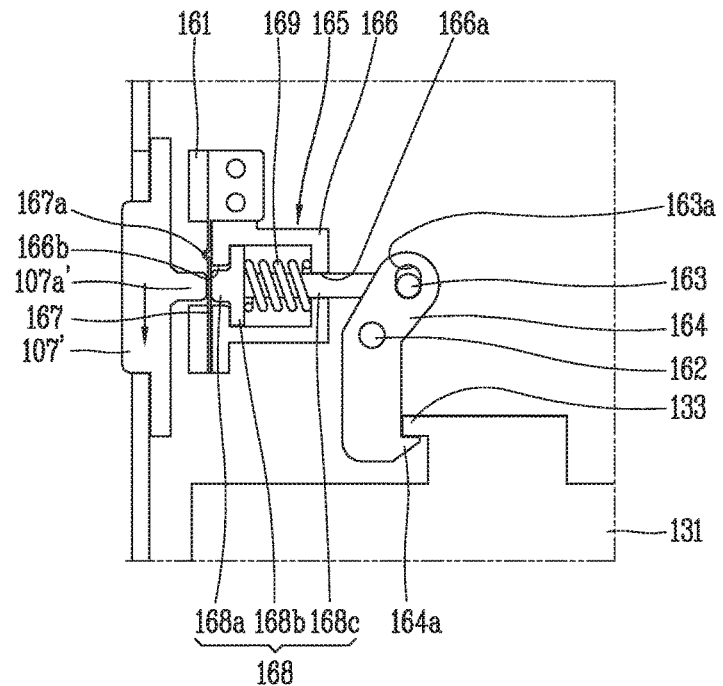
Figure 9C:
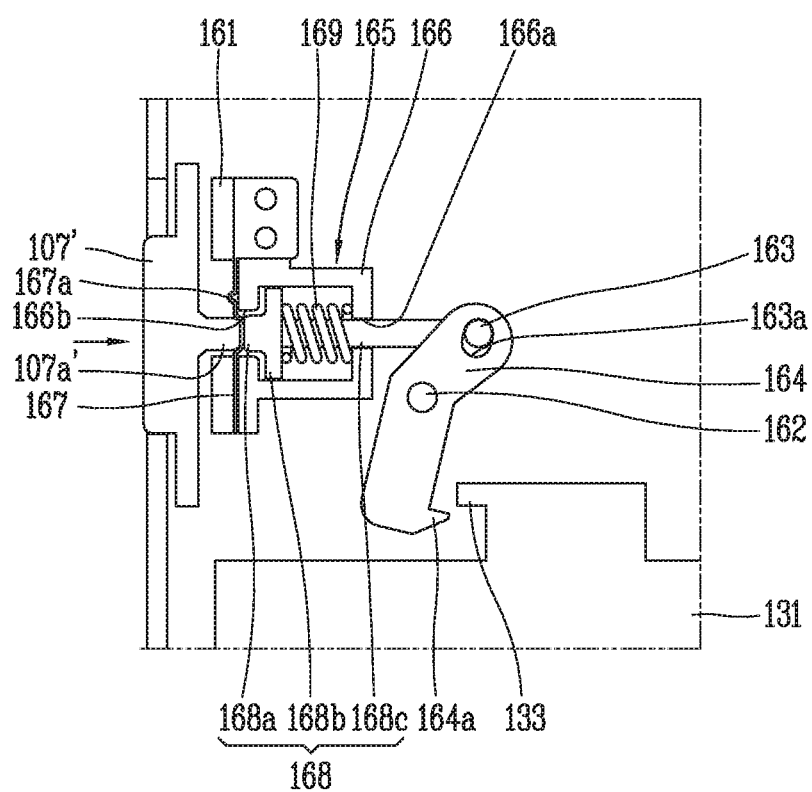

FIGS. 5 to 7 are views of a locking device 155 according to a first embodiment. FIGS. 9A to 9C are views of a locking device 165 according to a second embodiment. The locking device 155 according to the first embodiment of the present invention will now be described with reference to FIGS. 5 to 7.

FIG. 5 is a view illustrating the sliding portion 130 that is locked by the locking device 155 according to the first embodiment of the present invention. FIG. 6 is a view illustrating the sliding portion 130 that is unlocked by the locking device 155 according to the first embodiment of the present invention. FIG. 7 is an exploded perspective view of the locking device 155 according to an embodiment of the present invention. FIGS. 5 and 6 depict the sliding portion 130 attached to the main body portion 104—that is, the bracket 104a attached to the case 104b and the main circuit board 181 attached to the bracket 104a.

As shown in FIG. 5, the locking device 155 according to the first embodiment include a locking member 156 that is provided on the bracket 104a, with one end being caught on a pushing protrusion 107a protruding inwards from the slide button 107, and the other end being fastened to the sliding portion 130, both of which rotate about a rotary shaft 159, and a first elastic member 157 that is attached to the locking member 156 and provides torque to the locking member 156. A torsion spring may be used as the first elastic member 157 to provide torque to the locking member 156. The locking member 156 is approximately vertical, with the rotary shaft 159 at the center.

The other end of the locking member 156 takes the shape of a hook 156a, and the hook 156a is selectively caught on a protuberance 133 formed at the top of the sliding portion 130.

Referring to FIG. 7, the locking device 155 includes a cylindrical base portion 126 protruding from the bracket 104a, a locking member 156 that has a hollow space on the inside, corresponding in size to the cylindrical shape, and that is fitted to the base portion 126, and a first elastic member 157 that is fitted to the base portion 126 and fixed to two ends of the locking member 156 to rotate the locking member 156. In this case, a rotary shaft 159 may be provided that is exposed to the front through the base portion 126 from the back of the base portion 126. The rotary shaft 159 is fixed to the bracket 104a by a screw 159a. Moreover, an E-ring 158 or an O-ring is provided between the screw 159a and the locking member 156. The first elastic member 157 has stationary portions 157a and 157b that extent outward from the center at a given angle. A fine groove 156c is formed on the locking member 156 so that the stationary portions 157a and 157b are caught on the locking member 156.

Additionally, stationary serrations 125 for fixing the stationary portions 157a and 157b are formed on the bracket 104a. In order to adjust elasticity, a plurality of stationary serrations 125 may be formed to have various angles from the rotary shaft 159.

In the first position, the hook 156a is caught on the protuberance 133 to allow the sliding portion 130 to be inserted and fixed onto the terminal. A third elastic member 171 is provided under the bracket 104a. The third elastic member 171 provides restoring force to the sliding portion 130. Thus, in the first position, the restoring force of the third elastic member 171 causes the sliding portion 130 to move down, but the hook 156a of the locking member 156 keeps the sliding portion 130 from moving.

The third elastic member 171 is fitted to a protrusion 171a protruding from the bracket 104a and fixed in place, and does not come off easily. Also, the third elastic member 171 rests on an accommodating portion 171b, as shown in FIG. 6.

Further, the second battery 192 is provided on one side at the top of the third elastic member 171. The second battery 192 is electrically connected to the main circuit board 181 by a connection cable 193.

Afterwards, as shown in FIG. 6, when the locking member 156 is unlocked from the protuberance 133 by moving down the slide button 107, the locking member 156 rotates about the rotary shaft 159 by the first elastic member 157. Hereupon, the sliding portion 130 moves downward by the restoring force of the third elastic member 171. Accordingly, a first connector 172 on the bracket 104a and a first contact terminal 191a (see FIG. 3) of the first battery 191 are electrically disconnected, thereby turning off the power supply from the first battery 191. Besides, an electrical disconnection occurs between the display portion 151—more specifically, a second connector 175 at the bottom of the main circuit board 181—and a second contact terminal 134 at the second accommodating portion 132. The second contact terminal 134 has a plurality of electrodes 134a.

The second contact terminal 134 and the second connector 175 may make frontal contact or lateral contact with each other. For example, it will be understood that FIG. 6 illustrates frontal contact and FIG. 13 illustrates lateral contact. The type of contact depends on where on the second contact terminal 134 the electrodes 134a are provided. That is, the electrodes 134a make lateral contact when they are provided on the side of the second contact terminal 134, and make frontal contact when they are provided on the front of the second contact terminal 134.

The second contact terminal 134 is for electrically connecting a flexible circuit board 187 in the second accommodating portion 132 to the main circuit board 181, in order to activate the electrical elements accommodated in the second accommodating portion 132.

A jut 156b is formed on the edge of the locking member 156. When switching to the second position, the jut 156b descends as the locking member 156 rotates, thus bringing itself into contact with the pushing protrusion 107a.

FIGS. 9A to 9C are views illustrating an operative mechanism in which the sliding portion 130 is unlocked by the locking device 165 according to the second embodiment of the present invention. The locking device 165 according to the second embodiment of the present invention is provided on the inside of the slide button 107'. The locking device 165 includes a plate member 167 with elasticity that makes contact with a pushing protrusion 107a' protruding inwards from the slide button 107', a moving member 168 that is provided on the inside of the plate member 167, with one end being pressed by the pushing protrusion 107a' and the other end having a shaft 168c, a second elastic member 169 that surrounds the shaft 168c of the moving member 168 and provides restoring force to the moving member 168, a base member 166 that surrounds the moving member 168 and the second elastic member 169 and has a first through hole 166a at one end through which the shaft 168c passes and a second through hole 166b at the other end through which an end of the moving member 168 makes contact with the plate member 167, and a link member 164 that rotates about a stationary shaft 162, with one end being attached to the other end of the moving member 168 and the other end being fastened to the sliding portion 130.

The stationary shaft 162 refers to an immobile shaft, and the link member 164 rotates about the stationary shaft 162. As the moving member 168 moves, one end of the link member 164 moves and the other end of the link member 164 rotates away from the protuberance 133. A long hole 163a is formed at one end of the link member 164 and fastened to the moving member 168 by a fixing pin 163. That is, the link member 164 is fixed to the moving member 168 by the fixing pin 163, and the fixing pin 163 may be finely moved within the long hole 163a by the distance the moving member 168 moves.

A bump 167a is formed on the plate member 167 to detect movement of the pushing protrusion 107a. A hook 164a is formed at the other end of the link member 164, and the sliding portion 130 has a protuberance 133 that is caught on the hook 164a. The plate member 167 may be a leaf spring, and a projecting member 161 keeps the plate member 167 from coming off.

Moreover, the moving member 168 includes an exposure portion 168a that is exposed externally through the second through hole 166b, and an expanded portion 168b that extends from the exposure portion 168a, has a larger area than the exposure portion 168a, and is stuck in the second through hole 166b.

Referring to FIGS. 9A to 9C, the operative mechanism of the locking device 165 according to the second embodiment of the present invention will be described. FIG. 9A shows the first position. FIGS. 9B and 9C show a process of transition to the second position.

As shown in FIG. 9A, in the first position, the pushing protrusion 107a' formed on the inside of the slide button 107' is positioned atop the bump 167a, and is caught on the bump 167a and therefore cannot descend. In this case, the hook 164a is caught on the protuberance 133 of the sliding portion 130, thus keeping the sliding portion 130 from being separated from the main body portion 104.

Afterwards, when the user lowers the slide button 107' to replace the first battery 191, the pushing protrusion 107a' passes the bump 167a and is located at the moving member 168. The plate member 167 is provided between the pushing protrusion 107a' and the moving member 168 and takes the shape of a thin plate with elasticity. FIG. 9B illustrates the slide button 107' that is just ready to be pushed.

When the user presses the slide button 107', the pushing protrusion 107a' presses the plate member 167 and the plate member 167 presses the moving member 168. The moving member 168 moves inwards as it recovers elasticity by means of the second elastic member 169. The second elastic member 169 fitted to the shaft 168c is provided between the moving member 168 and the inside wall of the base member 166. As the moving member 168 moves to the inside of the main body portion 104, the link member 164 rotates about the stationary shaft 162 and the hook 164a is therefore spaced apart from the protuberance 133.

Once the protuberance 133 is released from the hook 164a, the sliding portion 130 moves downward by the elasticity of the third elastic member 171. As such, the first battery 191 accommodated in the sliding portion 130 may be replaced.

Figure 10:
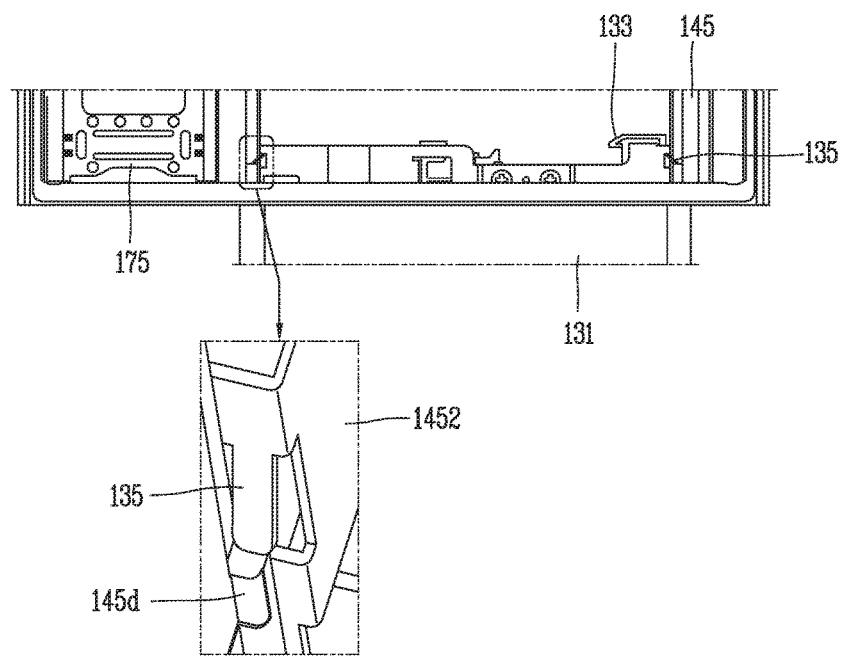
FIG. 10 is a view illustrating a structure in which a sliding portion is caught on a case according to an embodiment of the present invention.
Figure 11:
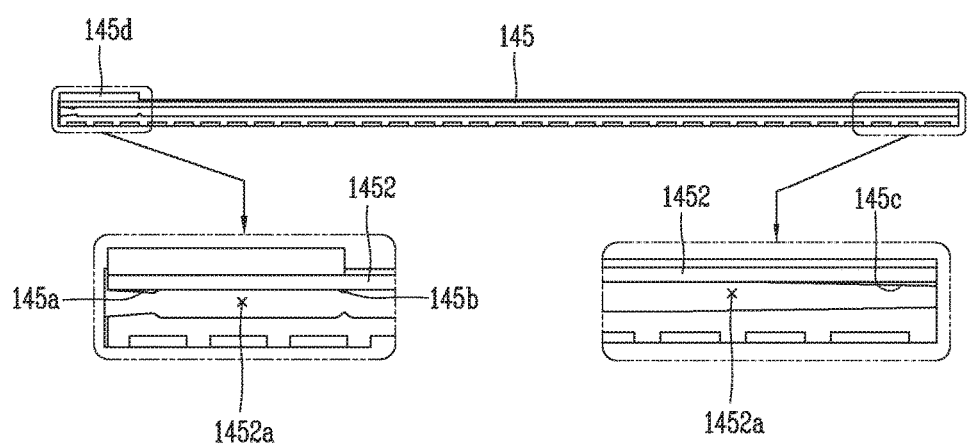
FIG. 11 shows a front view and partial exploded view of a guide rail according to an embodiment of the present invention.

FIG. 10 is a view illustrating a structure in which the sliding portion 130 is caught on the case 104b according to an embodiment of the present invention. FIG. 11 shows a front view and partial exploded view of the guide rail 145 according to an embodiment of the present invention.

FIG. 10 illustrates the sliding portion 130 being taken out from the main body portion 104 and the first accommodating portion 131 being caught on the bottom of the main body portion 104, which depicts a structure for keeping the sliding portion 130 from being fully separated from the main body portion 104.

That is, referring to FIG. 10, an outwardly protruding stopper 135 is provided at the top of the sliding portion 130, and a stopper rib 145d is formed on the guide rail 145 to catch the stopper 135 to thereby restrict the movement of the sliding portion 130. Since the stopper 135 is formed at the top of the sliding portion 130 and sloped downward, the sliding portion 130 is fastened to the main body portion 104 to allow for easy assembly as the stopper 135 is pushed inward when it slides and to keep the stopper 135 from coming off easily as it is caught on the stopper rib 145d when the sliding portion 130 is taken out.

Referring to FIG. 11, ribs 145a and 145b protruding towards the inside of the groove 1452a are formed on the rail 1452 so as to hold the sliding portion 130 when fastened to the main body portion 104. The ribs 145a and 145b have a structure for narrowing the movement path of the flaps 131a. The ribs 145a and 145b are formed near the stopper ribs 145 to prevent vertical movement between the sliding portion 130 and the guide rail 145 which may occur when the sliding portion 130 is taken out.

Moreover, the groove 1452a at the top of the rail 1452 may be tapered toward the end in order to restrict excessive movement of the flaps 131a of the sliding portion 130. That is, a sloping portion 145c gradually protrudes inward from the groove 1452a of the rail 1452. Thus, when the sliding portion 130 slides to the top of the rail 1452, excessive movement is restricted by the frictional force between the sloping portion 145c of the rail 1452 and the flaps 131a of the sliding portion 130. Moreover, the sloping portion 145c functions to hold the sliding portion 130 so that the sliding portion 130 is slowly taken out when removed.

Figure 12:
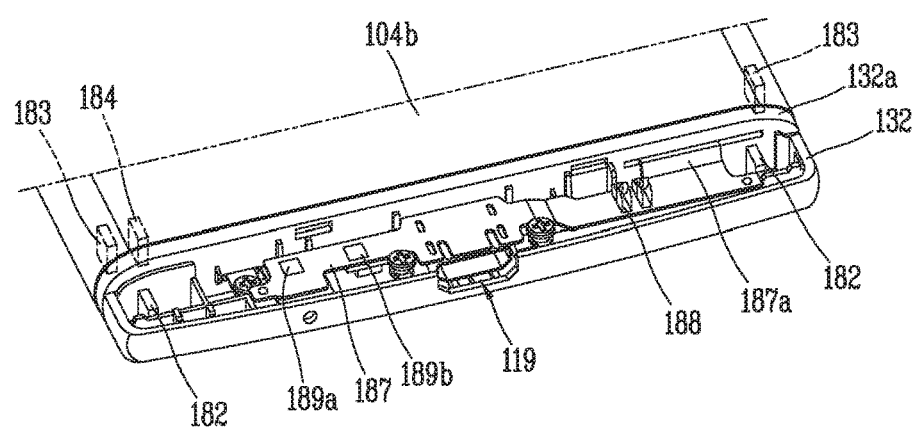
FIG. 12 is a perspective view of the bottom of a mobile terminal from which an antenna has been removed according to an embodiment of the present invention.
Figure 14:
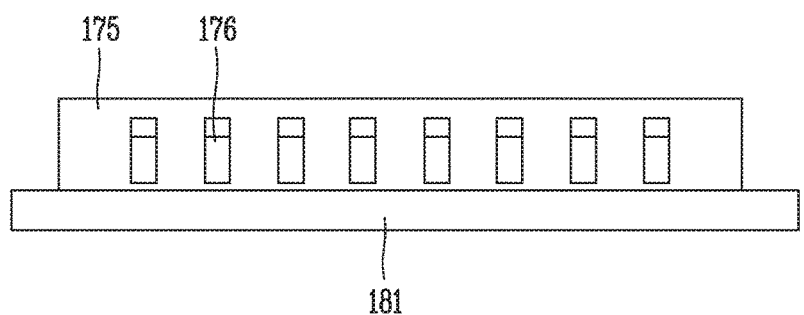
FIG. 14 is a plan view of a connector according to an embodiment of the present invention.

FIG. 12 is a perspective view of the bottom of a mobile terminal from which an antenna has been removed according to an embodiment of the present invention. FIG. 13 is a perspective view of a mobile terminal according to an embodiment of the present invention when viewed from the side of the bottom. FIG. 14 is a plan view of the second connector according to an embodiment of the present invention.

FIG. 12 is a perspective view of the bottom of a mobile terminal from which a decoration member 136 has been removed according to an embodiment of the present invention. FIG. 13 is a view illustrating an electrical connection between the main circuit board 181 and the flexible circuit board 187 when the sliding portion 130 with the decoration member 136 is fastened to the main body portion 104.

Referring to FIGS. 12 and 13, the flexible circuit board 187 electrically connected to the main circuit board 181 is provided in the first accommodating portion 131 so as to activate a variety of electronic parts in the second accommodating portion 132. The flexible circuit board 187 is externally exposed by a connecting portion 187a, and the exposed portion is electrically connected to the second connector 175 shown in FIG. 10. The connection may be established by contact terminals such as C-clips or pogo pins.

FIG. 14 illustrates contact terminals using C-clips. FIG. 14 depicts the second connector 175 connected to the main circuit board 181, which shows that a plurality of contact terminals 176 are provided. As the plurality of contact terminals 176 make contact with a second contact terminal 134 provided in the first accommodating portion 131, the flexible circuit board 187 and the main circuit board 181 are electrically connected. The second contact terminal 134 has a plurality of electrodes 134a so as to make contact with the contact terminals 176.

The decoration member 136 is an aluminum-containing metal sheet, and acts as a radiator for an antenna. The metal sheet is provided on the bottom of the rear of the sliding portion 130, and mainly functions to enable wireless communications for mobile communication. That is, the metal sheet functions as the main antenna 136 of the mobile terminal.

Therefore, when the sliding portion 130 is taken out from the main body portion 104, the main antenna 136 too is taken out and calls are interrupted. In this case, electric power is supplied to the main antenna 136 by a feed terminal 188. The feed terminal 188 may be in the form of C-clips or pogo pins.

In an embodiment of the present invention, the case 104b is made of a metallic material, and when the case 104b made of a metallic material is located near the main antenna 136, this affects the antenna performance. To prevent this, in an embodiment of the present invention, a strip-shaped blocking member 132a may be provided at the top of the second accommodating portion 132.

The blocking member 132a may be made of a transparent or semi-transparent plastic material, and may be made of the same or similar material as the second accommodating portion 132. The second accommodating portion 132 may have a light source 189a to illuminate the outside through the blocking member 132a. The light source 189a may perform a function for indicating the insertion or removal of the sliding portion 130. For example, when the sliding portion 130 is inserted into the main body portion 104 and the first connector 172 and the first contact terminal 191a of the first battery 191 make contact with each other, the light source 189a is activated to indicate to the user that the first battery 191 is connected. That is, the second accommodating portion 132 includes a lighting portion 132a made of a transparent or opaque material at the region of contact with the main body portion 104, and a light source 189a is provided in the second accommodating portion 132 to send light to the outside through the lighting portion 132a. That is, the blocking member may be the lighting portion, and the lighting portion may be provided separately from the lighting portion.

Meanwhile, according to an embodiment of the present invention, as shown in FIG. 11, a first magnet member 182 is provided in the second accommodating portion 132, and a second magnet member 183 is provided at a position in the main body portion 104 that corresponds to the first magnet member 182 so that the sliding portion 130 is completely fastened to the main body portion 104. It is needless to say that a metal member may be used in place of the second magnet member 183. The first and second magnet members 182 and 183 may be formed as a pair on two sides.

The main body portion 104 may have a Hall sensor 184 to detect a change in magnetism on the first magnet member 182. By using the Hall sensor 184, fastening of the sliding portion 130 is detected and indicated to the user by illumination through the lighting portion 132a.

A module 189b may be provided in the second accommodating portion 132. A plurality of sliding portions 130 each having a module for performing a particular function may be provided, which allows for mounting of a different module 189b each time the sliding portion 130 is replaced. The module 189b may be a module related to healthcare, such as a fingerprint recognition sensor or a heartbeat sensor. When a sliding portion 130 with a fingerprint recognition module is fastened to the main body portion 104, the user can be identified by a fingerprint imprinted on the surface of the second accommodating portion 132. Using fingerprint identification, the user can unlock their password the instant the user's fingerprint is touched, without having to enter in the password, thus activating the applications.

Moreover, the main antenna 136 may have a different frequency range depending on the sliding portion 130. Since the sliding portion 130 is equipped with an antenna with a particular frequency range, the same mobile terminal can be used in a number of countries or regions simply by replacing the sliding portion 130. That is, each country or region uses a different radio frequency range, and a plurality of sliding portions 130 may be made in such a manner that their antenna uses a different frequency range for a certain country or region. Thus, simply by replacing the sliding portion 130 with another sliding portion with an antenna with a frequency range required for the region where the user is located, wireless communications for mobile communication in that region may be made available on the same mobile terminal.

Figure 15:
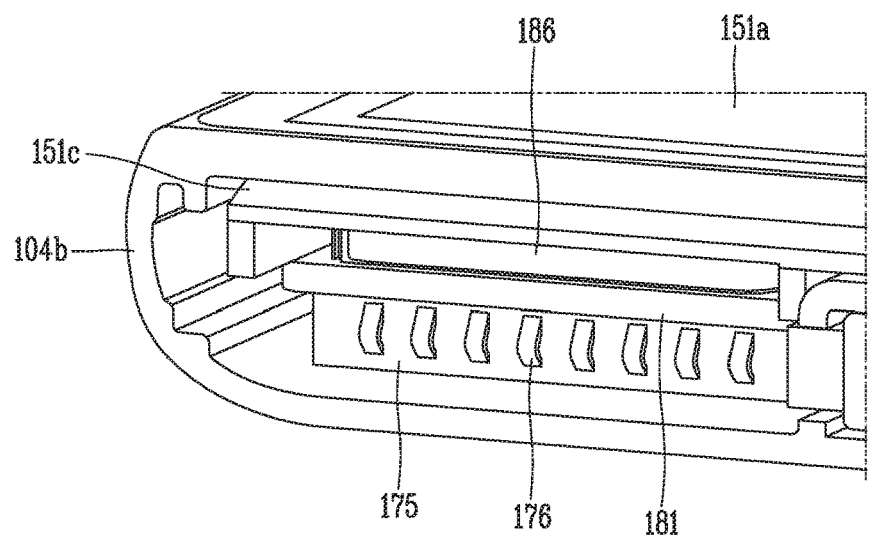
FIG. 15 is a perspective view of a mobile terminal according to an embodiment of the present invention when viewed from the bottom.

FIG. 15 is a perspective view of a mobile terminal according to an embodiment of the present invention when viewed from the bottom. As shown in FIG. 15, in an embodiment of the present invention, an identity module 186 may be provided on the intermediary frame 151c on the back of the display portion 151. The identity module 186 is a chip that stores various information to authenticate the use of the mobile terminal 100, and may include a user identity module (UIM), a subscriber identity module (SIM), a universal subscriber identity module (USIM), etc. A device (hereinafter, identification device) with an identity module may be made in the form of a smart card. The identity module 186 may be connected to the terminal 100 via an input/output port 119 to be described below.

The input/output port 119 may serve as a passage through which electric power from an external cradle is supplied to the mobile terminal 100 when the mobile terminal 100 is connected to the cradle, or serve as a passage through which various command signals input from the cradle by the user are sent to the mobile terminal 100. The various command signals or power input from the cradle may operate as signals for detecting that the mobile terminal 100 has been mounted correctly at the cradle.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

INDUSTRIAL APPLICABILITY

The embodiments of the present invention may be applicable to a mobile terminal for easily replacing a battery.

The invention claimed is:

1. A mobile terminal comprising:
a display portion with a window;
a main body portion where the display portion rests, with an inner space formed between the main body portion and the display portion;
a sliding portion that is brought into a first position for insertion into the inner space and a second position for removal from the inner space, and that accommodates a first battery;
a slide button that is exposed to an exterior of the main body portion; and
a locking device that is placed between the slide button and the sliding portion, and that selectively locks the sliding portion,
wherein the locking device comprises:
a plate member with elasticity that makes contact with a pushing protrusion protruding inwards from the slide button;
a moving member that is provided on an inside of the plate member, with one end being pressed by the pushing protrusion and another end having a shaft;
a second elastic member that surrounds the shaft of the moving member and provides restoring force to the moving member;
a base member that surrounds the moving member and the second elastic member, and that has a first through hole at one end through which the shaft passes and a second through hole at another end through which an end of the moving member makes contact with the plate member; and
a link member that rotates about a stationary shaft provided at a center of the second elastic member, with one end being attached to the other end of the moving member and another end of the link member being fastened to the sliding portion.

2. The mobile terminal of claim 1, further comprising a second battery that is provided in the inner space and supplies electric power to the mobile terminal when the first battery is removed,
wherein, in the first position, wireless communications for mobile communication and software operations are enabled by the first battery, and in the second position, wireless communications for mobile communication are interrupted and software operations are enabled by the second battery.

3. The mobile terminal of claim 1, wherein the locking device further comprises:
a locking member whose one end is caught on a pushing protrusion protruding inwards from the slide button, and whose another end is fastened to the sliding portion, both of which rotate about a rotary shaft; and
a first elastic member that is attached to the locking member and provides torque to the locking member.

4. The mobile terminal of claim 3, wherein the other end of the locking member takes a shape of a hook, and the hook is selectively caught on a protuberance formed at a top of the sliding portion.

5. The mobile terminal of claim 3, wherein the first elastic member is a torsion spring.

6. The mobile terminal of claim 1, wherein a bump is formed on the plate member to detect movement of the pushing protrusion.

7. The mobile terminal of claim 1, wherein a hook is formed at the other end of the link member, and the sliding portion has a protuberance that is caught on the hook.

8. The mobile terminal of claim 1, wherein the moving member comprises:
an exposure portion that is exposed externally through the second through hole; and
an expanded portion that extends from the exposure portion, has a larger area than the exposure portion, and is caught in the second through hole.

9. The mobile terminal of claim 1, wherein a long hole is formed at one end of the link member and fastened to the moving member by a fixing pin.

10. The mobile terminal of claim 1, wherein the case is made of a metallic material.

11. The mobile terminal of claim 1, wherein the main body portion comprises:
a case with a rear and a side protruding from the rear towards a front; and
a bracket affixed to an inner side of the case,
wherein a guide rail is formed along a length, on the inner side of the case, and the sliding portion moves along the guide rail.

12. The mobile terminal of claim 11, wherein a third elastic member is provided under the bracket and provides restoring force to the sliding portion.

13. The mobile terminal of claim 11,
wherein the sliding portion comprises:
a first accommodating portion that is curved to accommodate the first battery, has horizontally extending flaps at both ends, and moves on the guide rail when fastened to the main body portion; and
a second accommodating portion that is placed under the first accommodating portion and has a main antenna for performing a wireless communication function.

14. The mobile terminal of claim 13, wherein the display portion comprises:
a display module provided on a back of the window; and
a main circuit board provided on a back of the display module,
wherein a first contact terminal of the first battery and a first connector making contact with the first contact terminal are provided on one side of the main circuit board.

15. The mobile terminal of claim 14, wherein a flexible circuit board is provided in the first accommodating portion, a second contact terminal is provided at an end of the flexible circuit board, and a second connector electrically connected to the second contact terminal is provided on one side of the main circuit board.

16. The mobile terminal of claim 13, wherein the guide rail comprises:
a guide protruding from the inner side of the case; and
a rail that is provided within the guide and has a groove along a length in which the flaps of the sliding portion are inserted,
wherein the rail is made of a plastic material.

17. The mobile terminal of claim 16, wherein ribs protruding towards an inside of the groove are formed on the rail so as to hold the sliding portion when fastened to the main body portion.

18. The mobile terminal of claim 16, wherein a stopper is provided at the sliding portion, and a stopper rib is formed on the guide rail to catch the stopper to thereby restrict the movement of the sliding portion.

19. The mobile terminal of claim 13, wherein a first magnet member is provided in the second accommodating portion, and a second magnet member is provided at a position in the main body portion that corresponds to the first magnet member.

20. The mobile terminal of claim 19, wherein the main body portion has a Hall sensor to detect a change in magnetism on the first magnet member.

21. The mobile terminal of claim 13, wherein an antenna made of a metallic material forms an exterior on one side of the second accommodating portion.

22. The mobile terminal of claim 21, wherein the antenna has a different frequency range depending on the sliding portion.

23. The mobile terminal of claim 3, wherein the second accommodating portion comprises a lighting portion made of a transparent or opaque material at a region of contact with the main body portion, and a light source is provided in the second accommodating portion to send light to outside through the lighting portion.

24. The mobile terminal of claim 3, wherein a module is provided in the second accommodating portion to allow for mounting of a different module each time the sliding portion is replaced.

* * * * *